(No Model.)

W. A. DOWNS.
FARM GATE.

No. 425,411. Patented Apr. 15, 1890.

WITNESSES
C. J. Belt
W. Allen

INVENTOR
Wm. A. Downs.
by Herbert W. T. Jenner
Attorney

UNITED STATES PATENT OFFICE.

WILLIAM A. DOWNS, OF ROSCOMMON, MICHIGAN.

FARM-GATE.

SPECIFICATION forming part of Letters Patent No. 425,411, dated April 15, 1890.

Application filed November 23, 1889. Serial No. 331,329. (No model.)

*To all whom it may concern:*

Be it known that I, WILLIAM A. DOWNS, a citizen of the United States, residing at Roscommon, in the county of Roscommon and State of Michigan, have invented certain new and useful Improvements in Farm-Gates; and I do hereby declare the following to be a full, clear, and exact description of the invention, such as will enable others skilled in the art to which it appertains to make and use the same.

This invention relates to sliding and swinging gates; and it consists in the novel construction and combination of the parts hereinafter fully described and claimed.

Figure 1:
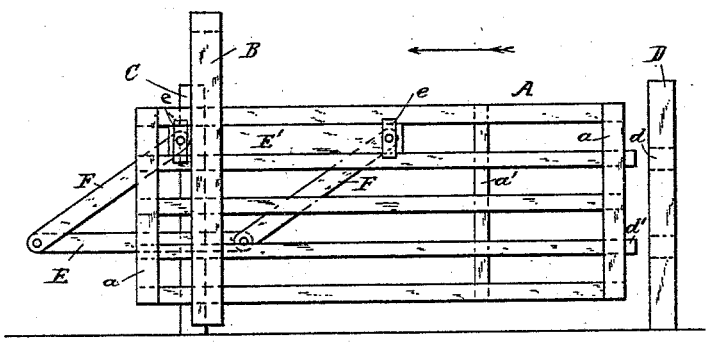
Figure 2:
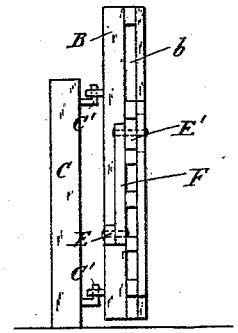
Figure 3:
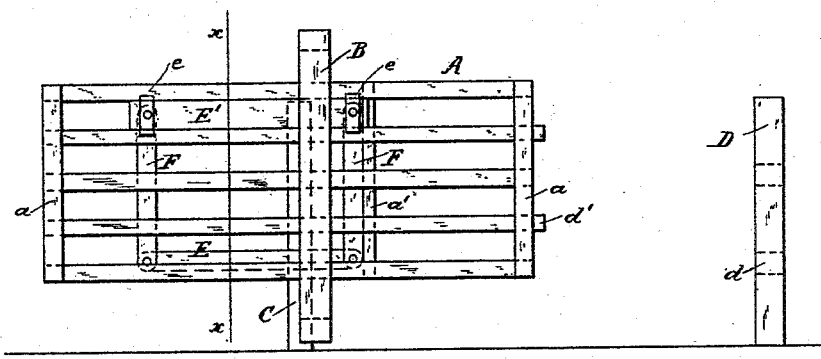
Figure 4:
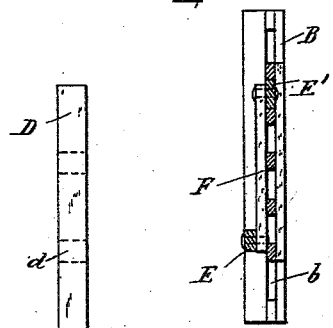

In the drawings, Figure 1 is a front view of the gate, showing it partly slid open. Fig. 2 is an end view of the gate. Fig. 3 is a front view of the gate fully slid back and raised up to clear snow. Fig. 4 is a cross-section taken on line $x$ $x$ in Fig. 3.

A is the gate, consisting of a series of horizontal bars provided with vertical end bars $a$ and an additional vertical bar $a'$ upon one side of it, the use of which will be explained hereinafter.

B is a vertical post built up of several pieces, which form a long slot or passage-way $b$ for the gate A to slide in.

C is a stationary gate-post secured in the ground, and C' are hinges or pivots by which the post B is hinged to the said post C after the ordinary manner of hanging a gate.

D is a stationary gate-post, also secured in the ground and provided with the pockets $d$ for the projecting ends $d'$ of the gate-bars to engage with when the gate is closed.

E is a horizontal bar secured to post B, and E' is a second bar parallel with bar E. The bar E' is arranged between the two top bars of the gate A, and the gate is adapted to slide longitudinally upon the said bar E'

F are arms pivoted to the ends of bars E and E', and $e$ are plates secured to bar E' to prevent the bars of the gate from running off it. The arms F are inclined when the gate is in its lowest position, and one of them rests against the vertical post, so that the gate cannot touch the ground.

The gate can be opened for foot-passengers by merely sliding it in the direction of the arrow, and opened for carriages by first sliding it back to clear the gate-post D and then turning it upon its hinges.

When snow is on the ground, the gate cannot be turned without first raising it to a higher level. This is accomplished by sliding it farther in the direction of the arrow. The bar $a'$ strikes against one of the arms F, and the continued movement of the gate in the same direction causes the inclined arms F to turn on their pivots until they assume a vertical position, and the gate is thereby raised and adapted to be turned on its hinges at a higher level, as shown in Fig. 3.

What I claim is—

1. In a gate, the combination, with a stationary gate-post, of a vertical post hinged to said gate-post and provided with a cross-bar, a vertically-adjustable horizontal bar, arms pivotally supporting each end of said bar and having their lower ends pivoted to said cross-bar, and a swinging gate adapted to slide upon the said horizontal bar at different elevations, substantially as set forth.

2. In a gate, the combination, with the vertical post, of the horizontal bar secured to said post, a second horizontal bar, and arms pivotally connecting the said bars, and a gate adapted to slide upon the said second horizontal bar and to be raised and lowered by turning the said arms upon their pivots, substantially as set forth.

3. In a gate, the combination, with the vertical post provided with a long passage-way, of a gate sliding back and forth in said passage-way and provided with the vertical bar $a'$, the horizontal bar secured to said post, a second horizontal bar for the gate to slide on, and arms pivotally connecting the said bars and adapted to be turned by bar $a'$ to separate the said horizontal bars and raise the gate in the passage-way of the vertical post, substantially as and for the purpose set forth.

In testimony whereof I affix my signature in presence of two witnesses.

WILLIAM A. DOWNS.

Witnesses:
FRANK CONVERSE,
L. J. HOLLAND.